United States Patent [19]
Maruyama et al.
[11] 4,234,877
[45] Nov. 18, 1980

[54] ION TYPE SMOKE SENSOR

[75] Inventors: Masaki Maruyama; Kohei Nakamura, both of Machida, Japan
[73] Assignee: Hochiki Corporation, Tokyo, Japan

[21] Appl. No.: 69,080
[22] Filed: Aug. 23, 1979
[30] Foreign Application Priority Data
Aug. 26, 1978 [JP] Japan .......................... 53-116220[U]
[51] Int. Cl.³ ........................ G08B 17/10; G01T 1/185
[52] U.S. Cl. ..................................... 340/629; 250/381
[58] Field of Search ........................ 340/628, 629, 630; 250/381, 382, 384, 385, 388, 389, 573, 574; 356/439

[56] References Cited

U.S. PATENT DOCUMENTS

| | | | |
|---|---|---|---|
| 3,733,596 | 5/1973 | Arima | 340/629 X |
| 3,959,788 | 5/1976 | Tipton et al. | 250/381 X |
| 4,004,288 | 1/1977 | Webb, Jr. | 340/628 |
| 4,023,152 | 5/1977 | Okuda et al. | 340/629 |
| 4,041,479 | 8/1977 | Miyabe | 340/629 |
| 4,081,795 | 3/1978 | Ogawa | 250/381 X |
| 4,084,156 | 4/1978 | Wittlinger | 340/629 |
| 4,096,473 | 6/1978 | Sweany et al. | 250/381 X |
| 4,123,656 | 10/1978 | Kajii | 340/629 X |
| 4,163,226 | 7/1979 | Ogawa | 340/629 |

*Primary Examiner*—John W. Caldwell, Sr.
*Assistant Examiner*—Daniel Myer
*Attorney, Agent, or Firm*—Phillips, Moore, Weissenberger, Lempio & Majestic

[57] ABSTRACT

In an ion type smoke sensor including a smoke sensor having an internal electrode, an intermediate electrode and an external electrode, and a field effect transistor having a control input terminal connected to the intermediate electrode, a first output terminal connected to the internal electrode and a second output terminal connected to the external electrode, an ion type smoke sensor of this invention comprises an oscillator circuit for generating an oscillating output having a predetermined oscillating frequency; a reference level source for intermittently producing an output signal with a predetermined reference level in response to the oscillating output from the oscillator circuit; and a comparing circuit for comparing a sensing output between the first and second output terminals of the field effect transistor with the reference level from the reference level source to produce a fire sensing signal in accordance with the result of the comparison. According to this invention, an erroneous alarm issuance is minimized as a result of a stable intermittent sensing operation. An operating point for determining the sensitivity of the sensor can be set easily and precisely.

10 Claims, 4 Drawing Figures

ION TYPE SMOKE SENSOR

BACKGROUND OF THE INVENTION

1. Field of the Invention

The present invention relates to an ion type smoke sensor in which a change of ion current at a smoke sensing part is detected by a field effect transistor (FET).

2. Prior Art

One example of this ion type smoke sensor is disclosed in U.S. Pat. No. 3,733,596. In order to reduce power consumption and to avoid or extremely lessen an erroneous alarm issuance of the sensor due to the invasion of insects into the sensor, an oscillating circuit such as a free running multivibrator is provided to intermittently pulse-drive an insulated gate field effect transistor (MOSFET) for sensing smoke. FIG. 1 shows a circuit construction of a conventional ion type smoke sensor, in which an oscillating output from an oscillator circuit 1 is applied to the base of a transistor 2 so as to render the transistor 2 conductive intermittently. The emitter of the transistor 2 is connected to a positive side power source line L1 and the collector is connected to a negative side power source line L2 by way of a series circuit including resistors R1 and R2. The resistors R1 and R2 constitute a voltage divider having a voltage dividing point producing a voltage pulse with a predetermined level and with a frequency corresponding to the oscillating output from the oscillator circuit 1. The voltage pulse is applied to the voltage dividing point of a voltage divider including resistors R3 and R4 connected in series between the power source lines L1 and L2, through a coupling capacitor C1. Accordingly, the voltage dividing point provides an output signal which is formed by superposing the above-mentioned voltage pulse onto a reference voltage defined by the resistors R3 and R4. The output signal as a result of this superposition is applied to the source electrode S of a field effect transistor (referred to as FET hereinafter) 3. The drain electrode D of the FET 3 is connected to the negative side power source line L2 via a resistor R5. The gate electrode G of the FET 3 is connected to an intermediate electrode 4*c* of a smoke sensing element 4. The external electrode 4*a* of the smoke sensing element 4 is connected to the positive side power source line L1 and the internal electrode 4*b* of the smoke sensing element 4 to the negative side power source line L2. The source potential of the FET 3 intermittently changes in accordance with the oscillating frequency of the oscillator 1 in response to the superposed output derived from the voltage divider having the resistors R3 and R4. At the same time, the gate G of the FET 3 receives the gate signal depending on the ion current of the smoke sensing element 4. As a result, a fire detecting signal is intermittently derived from the drain electrode D of the FET 3 via the output terminal 5.

In the circuit arrangement shown in FIG. 1, the FET 3 has a large capacitance and an impedance of the ion chamber forming the smoke sensing element 4 is very high. As a result, the output impedance of the smoke sensing element 4 with respect to the gate electrode G is high. Accordingly, if the FET 3 is driven directly in pulse mode, the operation of the FET 3 is not stable and consequently the fire sensing output is not stabilized.

SUMMARY OF THE INVENTION

With the above in view, an object of the invention is to provide an ion type smoke sensor which intermittently detects or senses smoke and minimizes an erroneous alarm issuance caused by electrical noises, insects or the like.

Another object of the present invention is to provide an ion type smoke sensor in which a sensing or detecting signal is produced intermittently without directly pulse-driving a sensing FET in order to stabilize the operation of the sensing FET.

Another object of the present invention is to provide an ion type smoke sensor which can easily and precisely set an operating point which determines the sensitivity of the smoke sensor.

Still another object of the invention is to provide an ion type smoke sensor capable of preventing the operating point of the smoke sensor from being varied due to the influence of a ripple voltage included in a power source voltage supplied from a receiver.

In an ion type smoke sensor including a smoke sensing means having an internal electrode, an intermediate electrode and an external electrode, and a field effect transistor having a control input terminal connected to the intermediate electrode, a first output terminal connected to the internal electrode and a second output terminal connected to the external electrode, the present invention features an oscillator circuit for generating an oscillating output having a predetermined oscillating frequency; a reference level source for intermittently producing an output signal with a predetermined reference level in response to the oscillating output from the oscillator circuit; and a comparing circuit for comparing a sensing output between the first and second output terminals of the field effect transistor with the reference level from the reference level source to produce a fire sensing signal in accordance with the result of the comparison.

According to this invention, the comparing circuit produces the fire sensing signal when a level difference between the sensing output and the reference level exceeds a predetermined threshold value.

According to this invention, the reference level from the reference signal source is adjustable. A capacitor for absorbing a power source ripple component may be connected to the second terminal of the field effect transistor. The first output terminal of the field effect transistor can be a drain terminal and the second output terminal a source terminal, and the field effect transistor may be arranged as a source follower. The reference level source may be comprised of a series circuit having a first transistor receiving the oscillating output from the oscillator circuit and a variable resistor, and a power source connected to the series circuit, and in which the reference level is derived from the variable resistor. Furthermore, the comparing circuit may include a second transistor having an emitter receiving the reference level from the variable resistor, a base receiving an output signal from the second output terminal of the field effect transistor through a diode and a collector from which the fire detecting signal is derived. The above-described second output terminal of the field effect transistor can be a source terminal.

Other objects, features and advantages of the invention will become apparent from the following description in conjunction with the accompanying drawings.

DESCRIPTION OF THE PREFERRED EMBODIMENTS

Figure 1:
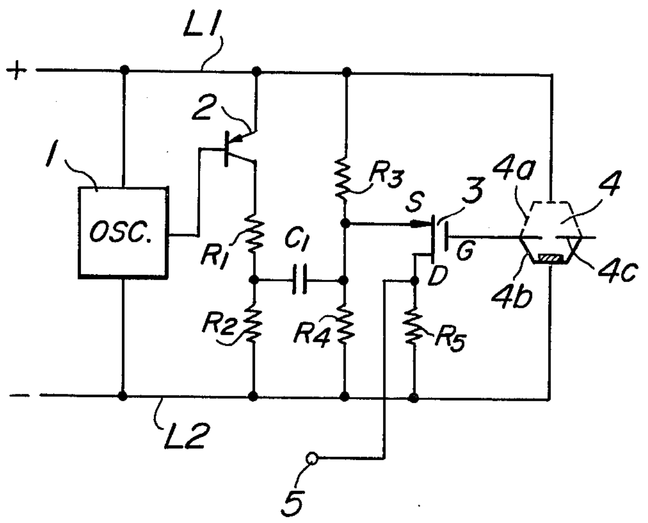
FIG. 1 PRIOR ART
FIG. 1 is a circuit diagram showing a circuit arrangement of a prior art ion type smoke sensor.
Figure 2:
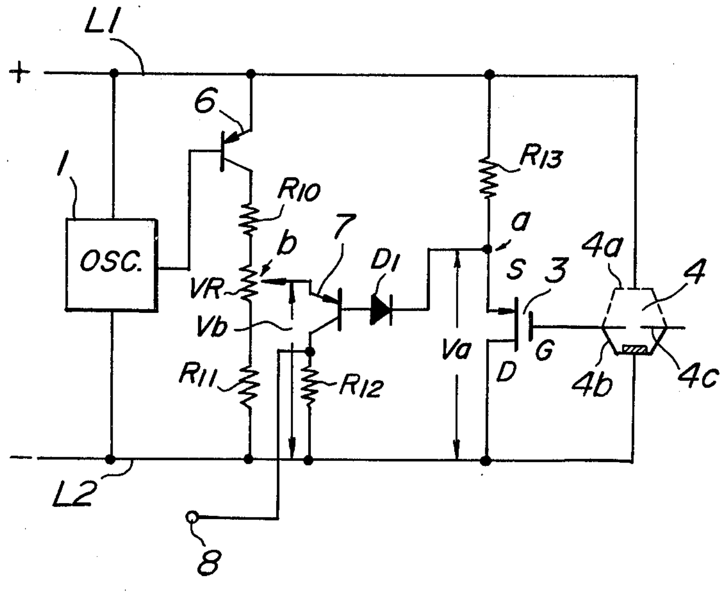
FIG. 2 is a circuit diagram showing an embodiment of an ion type smoke sensor according to the invention.

Reference is first made to FIG. 2 illustrating a circuit arrangement of an embodiment of an ion type smoke sensor according to the invention. Like the prior art ion type smoke sensor shown in FIG. 1, the ion type smoke sensor according to the invention has an oscillator circuit 1, the output terminal of which is connected to the base terminal of a transistor 6 connected in series to resistors R10 and R11 and a variable resistor VR. The series circuit having the resistors R10 and R11 and the variable resistor VR constitutes a reference source for setting a reference voltage which is compared with the detecting or sensing output signal from the FET 3. A reference voltage output Vb derived from a variable terminal b of the variable resistor VR is applied to the emitter terminal of a transistor 7 operating as a comparator. The collector terminal of the transistor 7 is connected to a negative side power source line L2 via a resistor R12 and to an output terminal 8 from which a fire detecting or sensing signal is derived. The output terminal 8 is connected to a switching circuit (not shown) for transmitting the fire detecting signal to a receiver. The base terminal of the transistor 7 is connected to the source terminal S of the FET 3 via a diode D1. The FET is arranged in the form of a grounded drain connection, i.e. a source follower connection. More specifically, the source terminal S of the FET 3 is connected to a positive side power source line L1 and to the external electrode 4*a* of a smoke sensor 4 through a source resistor R13. The drain terminal D is directly connected to the negative side power source line L2 and the internal electrode 4*b* of the smoke sensor 4. The gate terminal of the FET 3 is connected to the intermediate electrode 4*c* of the smoke sensor 4.

Here, the variable resistor VR is adjusted to set a reference voltage output (a voltage Vb at a point b) of the variable resistor VR with respect to the source potential (a voltage Va at a point a) of the FET 3 in such a way that the transistor 7 is non-conductive in a stationary state where no smoke enters the smoke detecting portion 4.

More particularly, a voltage Va which is the sum of a potential at the intermediate electrode 4*c* of the smoke sensor 4 and a gate-source threshold voltage $V_{GST}$ of the FET 3 is always applied to the point a. At the point b, the reference voltage Vb resulting from the voltage division through the resistors R10, R11 and VR intermittently appears in response to the ON-OFF operation of the transistor 6. Assume now that the voltage drop across the emitter-base circuit of the transistor 7, for example, when the transistor 7 becomes conductive, is 0.6 volts and the forward voltage drop of the diode D1 is approximately 0.6 volts. When the voltage Va at the point a with respect to the voltage Vb at the point b is lower than about 1.2 volts, transistor 7 is conductive. Therefore, if the variable resistor VR is so adjusted that, in the stationary state, the reference voltage Vb is lower than (the voltage at the point a) +1.2 volts, the intermittent application of the reference voltage Vb to the transistor 7 in response to the ON-OFF operation of the transistor 6 does not render the transistor 7 conductive. As a result, no fire sensing signal is delivered to the output terminal 8.

If smoke enters the space between the external electrode 4*a* and the intermediate electrode 4*c* of the smoke sensor 4, the conductive resistance of the FET 3 reduces, so that the voltage Va at the point a drops. If the difference between the voltages Va and Vb exceeds approximately 1.2 volts in accordance with this voltage drop, the intermittent reference voltage Vb from the transistor which is periodically turned on and off in accordance with the oscillating output from the oscillator circuit 1, is applied to the emitter of the transistor 7, so that the transistor 7 is intermittently conductive to transmit a fire sensing signal to the output terminal 8. Then, the sensing signal from the output terminal 8 is transmitted to the receiver, through a switching circuit (not shown). As seen from the description of the circuit operation, the point a is always biased in accordance with the potentials at the electrodes 4*a*, 4*b* and 4*c* in either case of the stationary or the fire sensing condition and the FET 3 is never pulse-driven, so that this circuit arrangement performs stabilized fire sensing operations.

Figure 3:
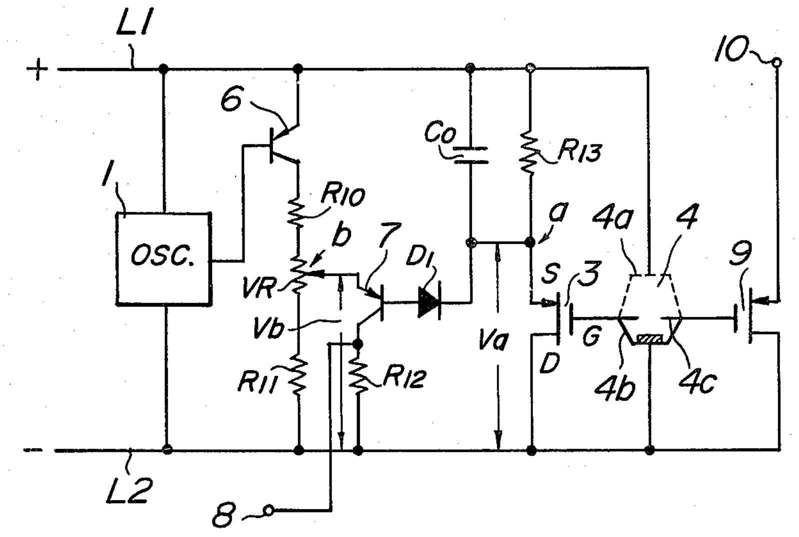
FIG. 3 is a circuit diagram showing another embodiment of an ion type smoke sensor according to the invention.
Figure 4:
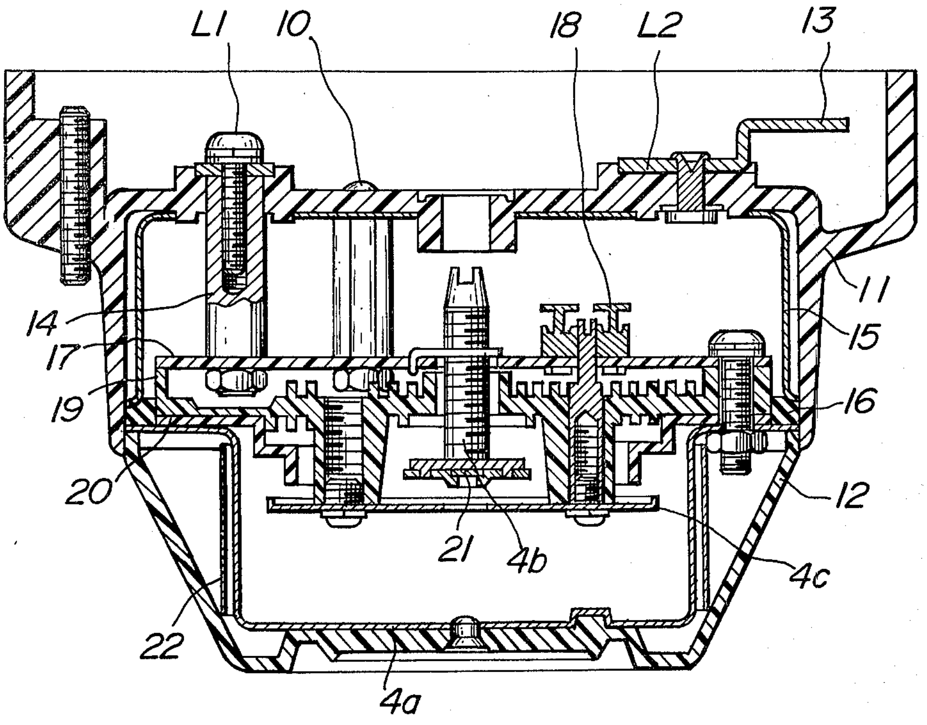
FIG. 4 is a longitudinal cross sectional view showing one embodiment of the construction of an ion type smoke sensor according to the invention.

Turning now to FIG. 3, there is shown another embodiment of this invention which prevents a variation of the operation points of the smoke sensor caused by a ripple voltage included in the power source voltage supplied from the receiver. An embodiment of the structure of the ion type smoke sensor according to this invention shown in FIG. 2 is shown in FIG. 4 for explaining the influence of the ripple voltage. In FIG. 4, reference numeral 11 designates a molded terminal board. A cover 12 is removably attached to the terminal board 11. Connecting terminal members 13 and 14 are fixed to the terminal board 11 to connect electrically the circuit shown in FIG. 2 to the receiver; a power source voltage is supplied from the receiver and a fire detecting output signal is transmitted to the receiver via the terminals 13 and 14. Reference numeral 15 designates a shielding case attached inside of the terminal board 11; 16 a packing; 17 a printed circuit board having the circuit shown in FIG. 2; 18 connecting pins for connecting the FET 3 onto the printed circuit board 17; 19 and 20 insulating boards; 21 a radiation source mounted to the internal electrode 4*b*; 22 a screen for preventing the invasion of insects.

In FIG. 4, a ripple component included in the power source voltage supplied to the printed circuit board 17 is induced in the intermediate electrode 4*c*. The gate impedance of the FET 3 shown in FIG. 2 is very high so that the ripple component at the electrode 4*c* applied to the gate terminal G appears directly at the source terminal S. Accordingly, the ripple voltage is superposed on the voltage Va at the point a. Since the operation of the sensor is intermittent in response to the output from the oscillator circuit 1, the operating point varies in accordance with the amplitude of the ripple component, depending upon whether the voltage Va at the point a is located at the crest or bottom of the ripple voltage at the time of intermittent driving. Accordingly, the circuit arrangement shown in FIG. 2 in which the FET 3 is not directly pulse-driven in order to stabilize the operation of the FET 3 is unsatisfactory for improving the stabilization of the operation in the case that a ripple component is included in the power source voltage. In order to reduce the influence of the ripple, a shielding plate may be placed between the printed circuit board 17 and the intermediate electrode 4c, for example, between the printed circuit board 17 and the insulating board 19, while the shielding plate is electrically connected to the positive side (the external electrode 4a) or the negative side. This method, however, is unadvisable from the viewpoint of the narrow space of the sensor, into which the shielding plate is to be inserted, as seen in FIG. 4, and from manufacturing work and manufacturing cost.

Accordingly, in order to solve the ripple problem, the embodiment shown in FIG. 3 has a capacitor Co connected in parallel to a source resistor R13 of the FET 3 so as to eliminate the ripple component and thereby to stabilize the voltage Va at the point a. Further, in FIG. 3, an FET 9 is provided for applying an analog detection signal derived from the sensor to a monitor terminal 10. If the shield plate is used, as described above, the induction of the ripple component from the monitor terminal 10 to the intermediate electrode 4c is inevitable. In comparison with this, the embodiment shown in FIG. 3 successfully removes the influence of the ripple voltage by a mere connection of the capacitor Co. Further, even if an electrical noise is applied to the smoke sensing FET 3, there is eliminated an erroneous alarm issuance, since the response of the source potential to the noise is slow.

As described above, the ion type smoke sensor according to the invention uses the smoke sensing FET in the form of a source follower and compares the source voltage of the FET with the intermittent reference voltage generated in accordance with the output of the oscillator circuit to produce a detecting signal. That is to say, the smoke sensor according to the invention is not of the type in which the smoke sensing FET is directly pulse-driven. As a result, a stable fire sensing operation is ensured so that the intermittent operation of the sensor in response to the oscillator circuit is stabilized. Consequently, an erroneous alarm issuance due to electrical noises, insects or the like is minimized. Furthermore, the operating point of the sensor can be set at a desired point by adjusting the reference voltage by means of the variable resistor. More specifically, the reference voltage is set by referencing a measured source voltage of the smoke sensing FET, so that it is easy to set the operating point of the sensor. In addition, the parallel connection of the capacitor with the source resistor of the FET ensures a more stable fire sensing operation by reducing the influence of a ripple component.

The invention has been described in detail with respect to preferred embodiments, and it will now be apparent from the foregoing to those skilled in the art that changes and modifications may be made without departing from the invention in its broader aspects. For example, if necessary, a coupling circuit or an amplifier circuit may be provided between the stages of the transistors. Further, the polarity of the power source may be interchanged. In this case, the conductivity type of the transistors must be interchanged; the direction of the diode is interchanged and the source terminal of the FET is interchanged with the drain terminal.

What is claimed is:

1. An ion type smoke sensor including a smoke sensing means having an internal electrode, an intermediate electrode and an external electrode, and a field effect transistor, having a control input terminal connected to said intermediate electrode, a first output terminal connected to said internal electrode and a second output terminal connected to said external electrode, for producing a sensing output between said first output terminal and said second output terminal, said ion type smoke sensor further comprising:

an oscillator circuit for generating an oscillating output having a predetermined oscillating frequency;

a reference level source for intermittently producing an output signal with a predetermined reference level in response to said oscillating output from said oscillator circuit; and a comparing circuit for comparing said sensing output of said field effect transistor with said reference level from said reference level source to produce a fire sensing signal in accordance with the result of the comparison.

2. An ion type smoke sensor as claimed in claim 1, wherein said comparing circuit produces said fire sensing signal when a level difference between said sensing output and said reference level exceeds a predetermined threshold value.

3. An ion type smoke sensor as claimed in claim 1, further comprising a capacitor for absorbing a power source ripple component, said capacitor being connected to said second output terminal of said field effect transistor.

4. An ion type smoke sensor as claimed in claim 1, wherein said first output terminal of said field effect transistor is a drain terminal and said second output terminal is a source terminal, and said field effect transistor is arranged as a source follower.

5. An ion type smoke sensor as claimed in claim 1, wherein said reference level from said reference signal source is adjustable.

6. An ion type smoke sensor as claimed in claim 3, wherein said reference level source is comprised of a series circuit having a first transistor receiving said oscillating output from said oscillator circuit and a variable resistor, and a power source connected to said series circuit, and wherein said reference level is derived from said variable resistor.

7. An ion type smoke sensor as claimed in claim 6, wherein said comparing circuit includes a diode, a second transistor having an emitter receiving said reference level from said variable resistor, a base receiving said sensing output from said second output terminal of said field effect transistor through said diode and a collector from which said fire detecting signal is derived.

8. An ion type smoke sensor as claimed in claim 7, wherein said second output terminal of said field effect transistor is a source terminal.

9. An ion type smoke sensor as claimed in claim 7, further comprising a capacitor for absorbing power source ripple, said capacitor being connected to said second output terminal of said field effect transistor.

10. An ion type smoke sensor as claimed in claim 9, wherein said second output terminal is a source terminal.

* * * * *